US012748454B2

(12) United States Patent
Gupta et al.

(10) Patent No.: US 12,748,454 B2
(45) Date of Patent: Sep. 29, 2026

(54) RELIABLE AND FAULT-TOLERANT CLOCK GENERATION AND DISTRIBUTION FOR CHIPLET-BASED WAFERSCALE PROCESSORS

(71) Applicant: The Regents of the University of California, Oakland, CA (US)

(72) Inventors: Puneet Gupta, Los Angeles, CA (US); Saptadeep Pal, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 167 days.

(21) Appl. No.: 18/693,786

(22) PCT Filed: Sep. 20, 2022

(86) PCT No.: PCT/US2022/044142
§ 371 (c)(1),
(2) Date: Mar. 20, 2024

(87) PCT Pub. No.: WO2023/049123
PCT Pub. Date: Mar. 30, 2023

(65) Prior Publication Data

US 2024/0385643 A1 Nov. 21, 2024

Related U.S. Application Data

(60) Provisional application No. 63/246,731, filed on Sep. 21, 2021.

(51) Int. Cl.

| | |
|---|---|
| ***G06F 1/10*** | (2006.01) |
| ***G06F 1/04*** | (2006.01) |
| ***G06F 1/08*** | (2006.01) |

(52) U.S. Cl.
CPC .................. *G06F 1/10* (2013.01); *G06F 1/08* (2013.01); *G06F 1/04* (2013.01)

(58) Field of Classification Search
CPC ................. G06F 1/10; G06F 1/08; G06F 1/04
USPC ......................................... 713/375, 500, 600
See application file for complete search history.

(56) References Cited

U.S. PATENT DOCUMENTS

| | | | | |
|---|---|---|---|---|
| 6,432,744 | B1 * | 8/2002 | Amador | H01L 21/4846 257/E21.511 |
| 7,945,804 | B2 * | 5/2011 | Jacobowitz | G06F 1/324 709/200 |
| 8,161,314 | B2 * | 4/2012 | Jacobowitz | G06F 1/06 713/400 |
| 11,064,626 | B1 | 7/2021 | Salmon | |
| 12,135,354 | B1 * | 11/2024 | Cai | G01R 31/318563 |

(Continued)

OTHER PUBLICATIONS

International Search Report and Written Opinion for PCT Application No. PCT/US2022/044142 date Jan. 12, 2023.

(Continued)

*Primary Examiner* — Ji H Bae
(74) *Attorney, Agent, or Firm* — Foley & Lardner LLP

(57) ABSTRACT

The present embodiments provide a solution for clock delivery, distribution to an entire waferscale system composed of many chiplets. A clock distribution scheme according to embodiments is also fault tolerant, i.e., the clock distribution network can avoid faulty chiplets on the substrate and reliably distribute clock to all the functional chiplets which are accessible by the network.

13 Claims, 4 Drawing Sheets

(56) References Cited

U.S. PATENT DOCUMENTS

| | | | | |
|---|---|---|---|---|
| 2002/0072135 | A1* | 6/2002 | Adachi .......... | G01R 31/318505 438/18 |
| 2007/0091712 | A1* | 4/2007 | Mohanavelu ............. | G06F 1/04 365/233.12 |
| 2010/0083028 | A1* | 4/2010 | Oh ............................ | G06F 1/08 713/600 |
| 2014/0103959 | A1* | 4/2014 | Andreev ........ | H03K 19/018585 716/105 |
| 2015/0378388 | A1 | 12/2015 | Franch et al. | |
| 2017/0199328 | A1* | 7/2017 | Shubin ................. | G02B 6/1228 |
| 2019/0041895 | A1* | 2/2019 | Miao ......................... | G06F 1/10 |
| 2019/0384367 | A1 | 12/2019 | Jain et al. | |
| 2020/0105718 | A1 | 4/2020 | Collins et al. | |
| 2020/0294181 | A1 | 9/2020 | Matam et al. | |
| 2023/0205252 | A1* | 6/2023 | Kashem .................... | G06F 1/10 327/76 |
| 2024/0255984 | A1* | 8/2024 | Hsieh ........................ | G06F 1/12 |
| 2025/0068521 | A1* | 2/2025 | Choi ................... | G06F 11/1417 |

OTHER PUBLICATIONS

Murali, "Clock Network Design for 2.5D Heterogeneous Systems," Georgia Tech Library, May 2020, Retrieved from internet Dec. 6, 2022, https://smartech.gatech.edu/handle/1853/64649, 50 pages.
Pal, et al., "Pathfinding for 2.5D Interconnect Technologies," SLIP '20, Nov. 5, 2020, San Diego, CA, 8 pages.

* cited by examiner

RELIABLE AND FAULT-TOLERANT CLOCK GENERATION AND DISTRIBUTION FOR CHIPLET-BASED WAFERSCALE PROCESSORS

CROSS-REFERENCE TO RELATED APPLICATIONS

The present application is a National Stage Entry under 35 U.S.C. § 371 of International Application No. PCT/US2022/044142, filed Sep. 20, 2022, which claims priority to U.S. Provisional Patent Application No. 63/246,731 filed Sep. 21, 2021, the contents of which are incorporated herein by reference in their entirety.

TECHNICAL FIELD

The present embodiments relate generally to computing and more particularly to a solution for clock delivery and distribution to an entire waferscale system composed of many chiplets.

BACKGROUND

Waferscale processor systems can provide the large number of cores and that large amount of interconnect bandwidth that are required by today's highly parallel workloads. One approach to building waferscale systems is to use a chiplet-based architecture where pre-tested chiplets are integrated on a passive high bandwidth interconnect substrate technology such as silicon interconnect fabric or integrated fan-out system-on-wafer. These technologies allow heterogeneous integration where chiplets with different functionalities (e.g., processor, memory) as well as built in disparate technologies (e.g., CMOS and DRAM) can be tightly integrated for significant performance and cost benefits. However, designing large scale systems using these technologies is challenging. One of the most important challenges that needs to be addressed is how to reliably deliver and distribute clocks to the chiplets in the system.

It is against this technological backdrop that the present Applicant sought to a technological solution to these and other technological issues rooted in this technology.

SUMMARY

The present embodiments provide a solution for clock delivery and distribution to an entire waferscale system composed of many chiplets. A clock distribution scheme according to embodiments is also fault tolerant, i.e., the clock distribution network can avoid faulty chiplets on the substrate and reliably distribute clock to all the functional chiplets which are accessible by the network.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

Figure 1A:
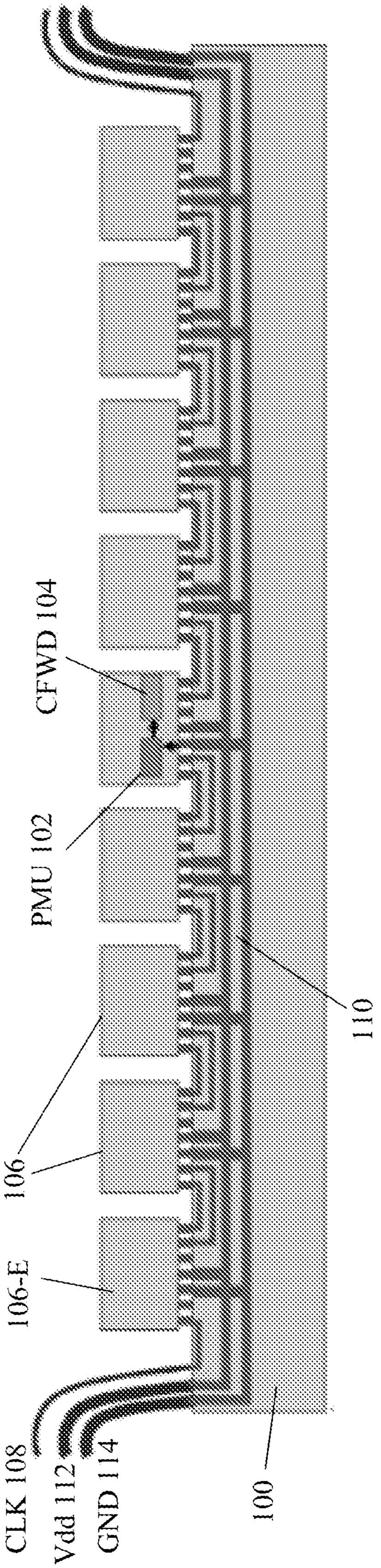
FIG. 1A is an example schematic of an example chiplet based waferscale processor showing edge power delivery.

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

The proliferation of highly parallel workloads such as graph processing, data analytics, and machine learning is driving the demand for massively parallel high-performance systems with a large number of processing cores, extensive memory capacity, and high memory bandwidth (Workload Analysis of Blue Waters, https://arxiv.org/ftp/arxiv/papers/1703/1703.00924.pdf, accessed Nov. 23, 2020); K. Shirahata et al., "A Scalable Implementation of a MapReduce-based Graph Processing Algorithm for Large-Scale Heterogeneous Supercomputers," 13$^{th}$ International Symposium on Cluster, Cloud, and Grid Computing, 2013). Often these workloads are run on systems composed of many discrete packaged processors connected using conventional off-package communication links. These off-package links have inferior bandwidth and energy efficiency compared to their on-chip counterparts and have been scaling poorly compared to silicon scaling (S. Pal et al., "A Case for Packageless Processors," IEEE International Symposium on High Performance Computer Architecture (HPCA), 2018). As a result, the overhead of inter-package communication has been growing at an alarming pace.

Waferscale integration can alleviate this communication bottleneck by tightly interconnecting a large number of processor, memory and/or networking chips on a large wafer. Multiple recent works have shown that waferscale processing can provide very large performance and energy efficiency benefits (Kamil Rocki et al., "Fast Stencil-Code Computation on a Wafer-Scale Processor," 2020, arXiv: 2010.03660; S. Pal et al. "Architecting Waferscale Processors-A GPU Case Study," IEEE International Symposium on High Performance Computer Architecture, 2019) compared to conventional systems. One approach to building waferscale systems is to integrate pre-tested known-good chiplets (referred to herein as un-packaged bare-dies/dielets as chiplets) on a waferscale interconnect substrate. Silicon interconnect fabric (Si-IF) and integrated fanout system-on-wafer (InFO-SoW) (S. R. Chun et al., "InFO_SoW (System-on-Wafer) for High Performance Computing," 2020 IEEE 70th Electronic Components and Technology Conference (ECTC), 2020, pp. 1-6) are tow example technologies which allow for tightly integrating many chiplets on a high-density interconnect substrate (A. A. Bajwa et al., "Demonstration of a Heterogeneously Integrated System-on-Wafer (SoW) Assembly," 68th ECTC, 2018). Also, in a chiplet-based waferscale system, the chiplets can be manufactured in heterogeneous technologies and can potentially provide better cost-performance trade-offs. For example, TBs of memory capacity at 100s of TBps alongside PFLOPs of compute throughput can be obtained which is suitable for big-data workloads in HPC and ML/AI.

Waferscale system design, however, has its unique set of challenges which encompass a wide range of topics from the underlying integration technology to circuit design and hardware architecture. One of the major challenges is to reliably supply clock to all the chiplets on the waferscale substrate.

According to certain aspects, the present embodiments provide a reliable clock generation and distribution mechanism for waferscale systems and/or other large chiplet based systems such as those including large interposers. In one solution, embodiments enable one or multiple master clocks from external oscillator source(s) to be provided to a subset of the chiplets on the wafer. The slower master clock or the faster clock generated by the PLLs in these chiplets can then be distributed across the wafer using a clock distribution network (ClkDN). The ClkDN is architected such that faulty blocks or nodes on the wafer can be avoided while ensuring all the useful non-faulty blocks get a working clock. Moreover, forwarding clocks over a large area means that the clock signals would traverse a large amount of combinational circuitry. Because of pull-up and pull-down strength mismatch in logic gates, duty cycle distortion can accrue and eventually lead to a poor clock signal, or it may even lead to complete disappearance of the clock signal. An embodiment solves this problem among others by inverting the clock between every node on the ClkDN and ensuring that one edge of the clock never accrues too much distortion.

The conventional way of clock delivery would be to distribute a slow master clock (running at a few 10 s of MHz) across the wafer using a passive ClkDN built on the waferscale substrate. Each chiplet would then use a PLL circuitry to generate a faster clock (e.g. 100 MHz to 1 GHz or more). However, there are two challenges in such a scheme.

First, the parasitic capacitance of a passive ClkDN which spans an area of up to 70,000 $mm^2$ and can have hundreds to thousands of sinks can be very large (>2000 pF and >600 nH). So, the clock distribution can only be done at sub-MHz frequency, often at <100 KHz. Getting a good crystal oscillator which can drive large capacitive load while ensuring absolute jitter performance of sub-100 pico-seconds is challenging.

Second, the PLL circuitry used to generate the on-chip fast clock would require a stable reference voltage for reliable operation. This can be an issue for such large systems where the noise in the power distribution network can be >10%. Moreover, often supplying a clean and stable analog voltage for all the chiplets may not be possible. Also, there can be cases where the power is delivered only at the edge of the wafer and the since the voltage regulation in the chiplets away from the edge may not perfect, regulated voltage could fluctuate by a large amount. As a result, stable fast clock can only be generated near the edge of the wafer where the chiplets can access near-by off-chip decoupling capacitors.

A schematic of an example waferscale processor system for implementing aspects of the present embodiments is shown in FIG. 1A. As shown in FIG. 1A, a waferscale processor system includes a large number of tightly interconnected chips 106 (e.g. processor, memory and/or networking chips) on a large wafer 100. As set forth above, some or all of chips 106 can comprise pre-tested known-good chiplets (referred to herein as un-packaged bare-dies/dielets as chiplets). These are all integrated with a waferscale interconnect substrate 110, using a silicon interconnect fabric (Si-IF) and/or integrated fanout system-on-wafer (InFO-SoW) technologies, for example. As set forth above, although the present embodiments will be described in connection with a useful example of a waferscale system, this example is not limiting; rather, the present embodiments include other large chiplet based systems, such as those including large interposers.

Figure 1B:
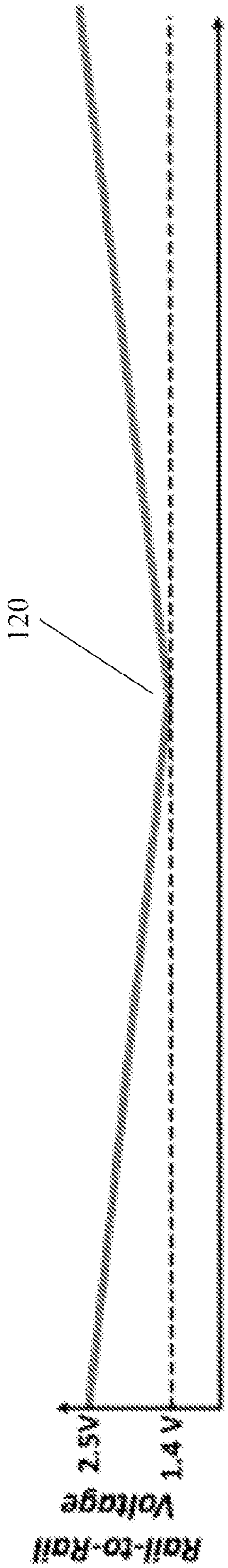
FIG. 1B is a waveform illustrating an example of rail-to-rail voltage droop across the width of a waferscale processor such as that shown in FIG. 1A.

The present Applicant recognizes, among other things, that in a system such as that shown in FIG. 1B, the chiplets 106 at the edge of the wafer 100 receive power at higher voltage than the ones at the center because of voltage droop 120 as the current moves towards the center of the wafer 100. The power management unit (PMU) 102 in each chiplet 106 then regulates the power and supplies that chiplet with power at the appropriate operating voltage.

Therefore, embodiments of this disclosure provide the master clock 108 to the chiplets 106-E at the edge of the wafer 100. As will be described in more detail below, a fast clock will be generated in one of the edge chiplets 106-E and then this clock is forwarded throughout the chiplet array using forwarding circuitry 104 built inside every chiplet 106. This strategy can ensure that a clean and stable fast clock can be generated by the edge chiplets having better voltage stability. The forwarding circuitry then ensures that the generated fast clock can be distributed reliably across the entire waferscale substrate.

Although FIG. 1A only shows chiplets 106 comprising a PMU 102 and clock forwarding circuitry 104, this is done solely for illustrating aspects of the embodiments. For example, it should be apparent that chiplets 106 can comprise substantially more and/or complex circuitry (e.g. logic, etc.) for implementing a specific type of chip (e.g. processor, memory and/or networking chip).

Figure 2:
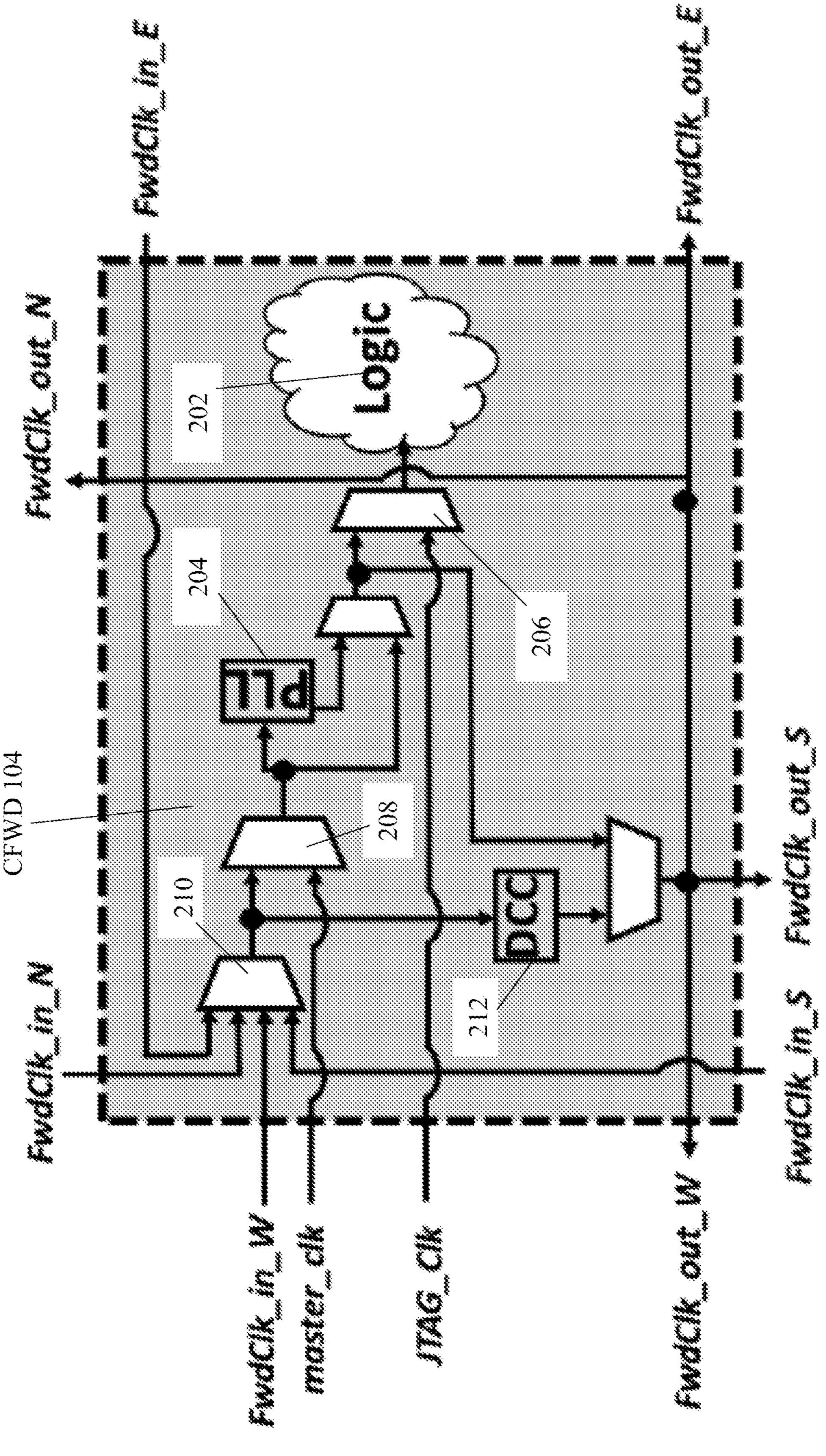
FIG. 2 is an example schematic of clock selection and forwarding circuitry according to embodiments.

Next described is an example clock selection and forwarding circuitry 104 according to embodiments, a schematic of which is shown in FIG. 2.

In embodiments, the clock selection and forwarding circuitry 104 is included in every chiplet 106 in a system such as that shown in FIG. 1A. As shown in FIG. 2, the example circuitry 104 receives a controlled master clock (master_Clk) (e.g. running at a few 10 s of MHz), a test/JTAG clock (JTAG_Clk) and four forwarded clocks (FwdClk_in), one from the neighboring chiplet on each side (N, S, E, W). Circuitry 104 also provides four outputs (FwdClk_out) to forward a clock to the neighboring chiplets on all sides (N, S, E, W). During the testing phase when an oscillator clock may not be available, the JTAG clock (JTAG_Clk) would be selected as the functional clock for the chiplet. During the program execution phase however, either one of the four forwarded input clocks (FwdClk_in) or the master clock (master_clk) can be selected as the functional clock for the chiplet logic 202. If the frequency of the selected tile clock needs to be multiplied, it can be optionally passed on to the PLL 204. Moreover, one of these five clocks is selected to be forwarded to all the neighboring tiles.

During boot-up, the selector 206 is configured to default to using the software controlled JTAG clock (e.g. using bootup circuitry in each chiplet 106, for example). Using JTAG, embodiments then initiate the clock setup phase. In this phase, one or multiple edge chiplets is selected or identified (e.g. using bootup circuitry in each chiplet 106, for example) and configured using selector 208 to generate a faster clock (e.g. using PLL 204) from the slower system clock that is provided from an off-the-wafer crystal oscillator source (e.g. master_clk, running at a few 10 s of MHz). The generated faster clocks (e.g. running 100 MHz to 1 GHz or more) from the edge chiplets 106-E are forwarded to their neighboring chiplets. The non-edge chiplets 106 (as determined using bootup circuitry in each chiplet 106, for example) are then configured for the auto-clock selection phase. In this phase, selectors 208 and 210 select the forwarded clock which starts toggling and is the first to reach a pre-defined toggle count (the default in one implementation). Once a forwarded clock is selected, the clock setup phase for that chiplet terminates and the selected clock is forwarded to its neighboring tiles. This ensures that no live-lock scenarios occur in the clock forwarding process.

One potential issue with such a clock forwarding scheme is that the fast clock can accrue duty cycle distortion because of pull-up/pulldown imbalance in the buffers, inverters, forwarding unit components and inter-chiplet I/O drivers (Kaijian Shi, Synopsys, "Clock Distribution and Balancing Methodology For Large and Complex ASIC Designs," Accessed Nov. 23, 2020). As the clock traverses across multiple chiplets in the array, this duty cycle distortion can potentially kill the clock, e.g., a 5% distortion per tile could kill the clock with in just 10 tiles. In order to avoid this issue, embodiments forward an inverted version of the clock. This ensures that the distortion is alternated between the clock cycle halves. Moreover, these and other embodiments also include a cycle distortion correction (DCC) unit 212 (Yi-Ming Wang and Jinn-Shyan Wang, "An all-digital 50% duty-cycle corrector," IEEE International Symposium on Circuits and Systems, 2004), which can correct any residual distortion. On the other hand, the half-cycle phase delay and any jitter introduced is not a concern since the inter-chiplet data communication would use asynchronous FIFOs and clock domain crossing cells.

Next described is an example fault tolerance scheme in the Clk distribution network (ClkDN) according to embodiments.

Faulty chiplets can potentially disrupt the clock forwarding mechanism. A clock generation and forwarding scheme according to embodiments, however, has resilience built in. Because any chiplet at the edge can generate a faster clock, there isn't a single point of failure in clock generation. Moreover, because every non-edge chiplets receives clocks from all four directions, this ensures that if at least one of the neighboring chiplets out of the four is not faulty, then the clock can reach that chiplet and be further forwarded. By induction, it can be proved that the generated fast clock can reach all non-faulty chiplets on the wafer, unless all the neighboring chiplets of a specific chiplet are faulty.

Figure 3:
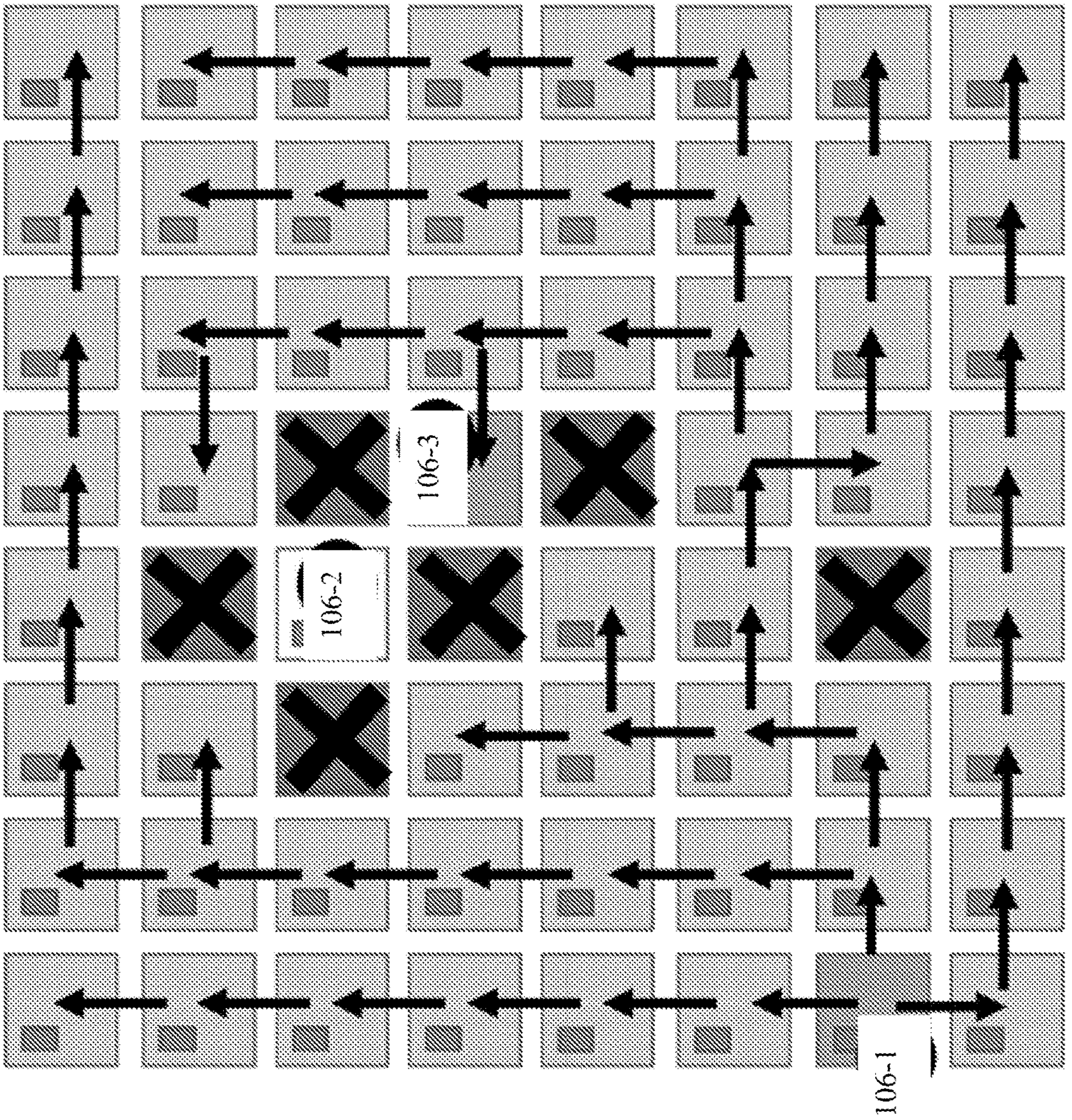
FIG. 3 illustrates an example clock forwarding configuration for a system with faulty tiles in accordance with embodiments.

FIG. 3 shows one possible clock forwarding configuration for an example 8×8 chiplet array with one or more faulty tiles. The edge chiplet (106-1) generates the fast clock that gets forwarded across the entire wafer. Even with six faulty chiplets in the array (designated with X's in FIG. 3), all chiplets except chiplet 106-2 can receive the forwarded clock. Tile 106-2 has faulty tiles on all four sides and hence, is unable to receive the clock from any of its neighbors. This chiplet would have been rendered unusable even without the scheme of the present embodiments since there is no available path for other chiplets to communicate with this tile using the waferscale inter-tile data network 110. On the other hand, tile 106-3 can still receive the forwarded clock even when surrounded by three faulty tiles. This is because it has one non-faulty neighbor from which it receives the generated clock.

It should be noted that although FIG. 3 shows one example of a scheme that uses a fast clock from a single edge chiplet for an entire array, that this example is not limiting. For example, there can be many fast clocks generated from many edge chiplets. These multiple fast clocks can all be used for the entire array and/or some fast clocks can only be used for a single sub-arrays of chiplets in the array. It should be apparent that many alternatives and variations are possible within the principles of the described embodiments.

Figure 4:
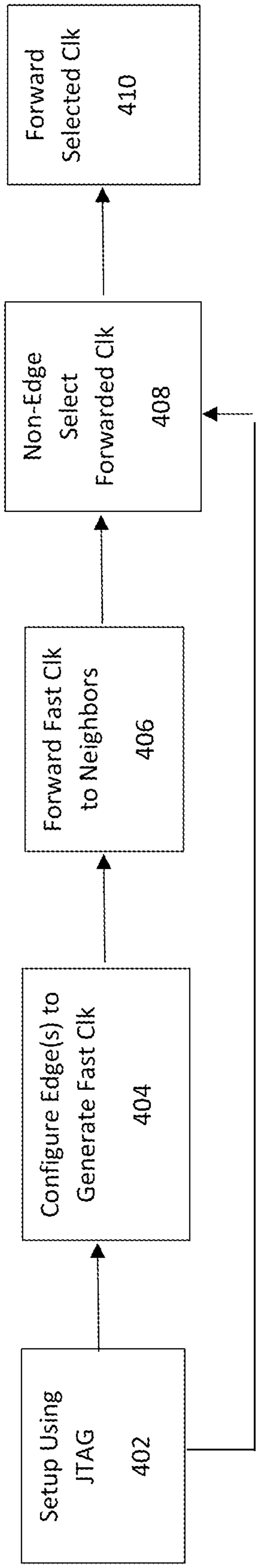
FIG. 4 is a flowchart illustrating an example methodology in accordance with embodiments.

FIG. 4 is a flowchart illustrating an example clock selection and forwarding methodology for a waferscale processor system according to embodiments.

In 402 (e.g. during boot-up), each chiplet is configured to default to using the software controlled JTAG clock. Using JTAG, embodiments then initiate the clock setup phase. In 404 one or multiple edge chiplets 106-E is selected and configured to generate a faster clock from the slower system clock that is provided from an off-the-wafer crystal oscillator source (e.g. master_clk). In 406 the generated faster clocks from the edge chiplets 106-E are forwarded to their neighboring chiplets. In 408 the non-edge chiplets 106 are then configured to select the forwarded clock which starts toggling and is the first to reach a pre-defined toggle count (the default in one implementation). In 410, once a forwarded clock is selected, the clock setup phase for that chiplet terminates and the selected clock is forwarded to its neighboring tiles.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably coupleable," to each other to achieve the desired functionality. Specific examples of operably coupleable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

Although the present embodiments have been particularly described with reference to preferred examples thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. An apparatus, comprising:

a plurality of chiplets integrated on a single substrate;

a clock generation and distribution (ClkDN) mechanism configured to provide a master clock from an external oscillator source to one of the chiplets on the substrate, convert the master clock to a faster clock having a higher frequency than the master clock in the one of the chiplets, and distribute the faster clock from the one of the chiplets to others of the plurality of chiplets across the substrate, wherein the others of the plurality of chiplets are configured to use the distributed faster clock.

2. The apparatus of claim 1, wherein the ClkDN mechanism is further configured such that each of the others of the plurality of chiplets on the substrate receive the faster clock from one or more neighbor chiplets.

3. The apparatus of claim 1, wherein the ClkDN mechanism is further configured to invert the faster clock between every one of the others of the plurality of chiplets on the substrate.

4. A system comprising:

a wafer comprising an interconnect substrate; and a plurality of chips incorporated on the wafer, each of the chips comprising one of a processor chip, a memory chip or a networking chip, wherein each of the chips includes clock selection and forwarding circuitry configured to:

receive a master clock and generate a first faster clock that is higher in frequency from the master clock, forward the first faster clock to a plurality of neighbor chips, and receive a different faster clock from the plurality of neighbor chips.

5. The system of claim 4, wherein plurality of chips comprise un-packaged bare-dies/dielets.

6. The system of claim 4, wherein the interconnect substrate comprises a waferscale interconnect substrate.

7. The system of claim 4, wherein the interconnect substrate comprises a silicon interconnect fabric (Si-IF).

8. The system of claim 4, wherein the interconnect substrate comprises an integrated fanout system-on-wafer (InFO-SoW) technology.

9. The system of claim 4, wherein the plurality of neighbor chips comprise chips on four sides, the four sides comprising North, South, East, and West.

10. The system of claim 4, wherein the clock selection and forwarding circuitry comprises a PLL for generating the first faster clock from the received master clock.

11. The system of claim 4, wherein the clock selection and forwarding circuitry comprises a plurality of selectors that are configured for receiving the master clock, forwarding the first faster clock and receiving the different faster clock using bootup circuitry.

12. The system of claim 4, wherein the clock selection and forwarding circuit comprises a cycle distortion correction unit that is configured for forwarding an inverted version of the different faster clock.

13. The system of claim 4, wherein the clock selection and forwarding circuitry in each of the chips is further configured to cause either the first faster clock or the different faster clock to be used as a functional clock within the each chip.

* * * * *